(No Model.)
C. P. FAY.
RAPIDLY ADJUSTING NUT FOR CALIPERS AND DIVIDERS.
No. 334,764. Patented Jan. 26, 1886.
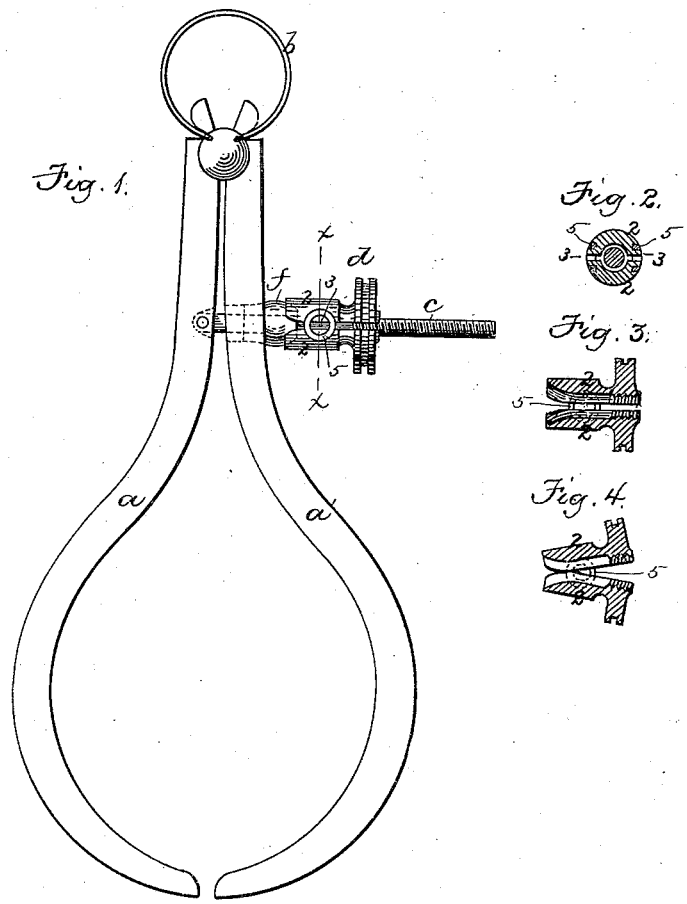
Witnesses.
Thos. E. O'Connor
H. Brown
Inventor
C. P. Fay
by Wright & Brown
Attys.

UNITED STATES PATENT OFFICE.

CHARLES P. FAY, OF SPRINGFIELD, MASSACHUSETTS.

RAPIDLY-ADJUSTING NUT FOR CALIPERS AND DIVIDERS.

SPECIFICATION forming part of Letters Patent No. 334,764, dated January 26, 1886.

Application filed July 17, 1885. Serial No. 171,854. (No model.)

*To all whom it may concern:*

Be it known that I, CHARLES P. FAY, of Springfield, in the county of Hampden and State of Massachusetts, have invented certain new and useful Improvements in Calipers and Dividers, of which the following is a specification.

This invention relates to calipers and dividers of the class in which the legs are pressed from each other by a spring, and one leg having a threaded retaining-rod pivoted to it and passing through a hole in the other leg, said rod having a nut which limits the distance to which the legs are spread or separated by the spring.

The invention has for its object to provide a retaining-nut for this class of calipers or dividers which shall be capable of ready separation from the threaded rod, so that it can be quickly moved thereon, and is automatically engaged with the rod by the pressure of the spring.

To this end the invention consists in a nut composed of two sections connected by a hinged joint and formed so that they are capable of rocking on said joint, one end of the nut being threaded to engage with the retaining-rod while its other end is formed to receive the outer end of the washer interposed between the nut and the leg of the instrument, said washer acting as a wedge to separate the ends of the nut-sections at one side of the joint of the nut, and thus close the opposite ends, which are threaded, upon the rod, as I will now proceed to describe.

Of the accompanying drawings, forming a part of this specification, Figure 1 represents a side elevation of a pair of calipers provided with my improvement. Fig. 2 represents a section on line *x x*, Fig. 1. Fig. 3 represents a longitudinal section of the nut as engaged with the retaining-rod. Fig. 4 represents a similar section, showing the nut opened at its threaded end to disengage it from the retaining-rod.

The same letters of reference indicate the same parts in all the figures.

In the drawings, *a a'* represent the legs of a pair of spring-calipers, and *b* represents the spring which presses said legs apart. The spring is in the present instance made in a separate piece from the legs, as shown in Letters Patent of the United States granted to me June 2, 1885, No. 319,215; but it may be made in the same piece with the legs or in any suitable manner, the construction of the instrument, aside from the retaining-nut, forming no part of my present invention.

*c* represents the retaining rod or screw, which is pivoted at one end to the leg *a*, and passes through a hole in the leg *a'* as usual.

*d* represents the retaining-nut, which is composed of two halves or sections, 2 2, connected by hinge-joints 3 3, and formed so that their outer ends, which are provided with internal screw-threads to engage with the rod *c*, may be separated by turning the sections on the joints 3, as shown in Fig. 4, thus separating or disengaging the threaded part of the nut from the rod and permitting the nut to be moved freely any desired distance along the rod. The ends of the sections 2 2 opposite to the threaded ends receive the outer end of a washer, *f*, interposed between the nut and the leg *a'*. The pressure of the spring *b* upon the legs *a a'* causes said washer to hold the sections of the nut in the position shown in Figs. 1, 2, and 3, the threaded portion of the nut being thus held in engagement with the rod *c*. When the nut is to be disengaged from the rod, the legs *a a'* are pressed toward each other to permit the removal of the washer from the nut, and the inner ends of the sections are then pressed together, as shown in Fig. 4. When the nut has been adjusted, the legs are allowed to separate and press the washer against the inner ends of the nut-sections, thus closing the threaded ends upon the rod.

It will be seen that the nut is capable of quick disengagement and adjustment and is automatically engaged by the spreading of the legs.

The hinge-joints 3 3 are preferably formed by inserting small steel rings 5 5 in correspondingly-formed recesses or sockets formed in the sections, as shown in Figs. 1 and 2, each ring entering sockets in both sections, as shown in Figs. 1 and 2. Any other suitable means may be employed for connecting the sections, if preferred.

I am aware that a retaining-nut for calipers has been provided at one end with internally-threaded spring-jaws which open automatically and are closed upon the rod by the pressure of the adjacent leg upon the free ends of said jaws; hence I do not claim, broadly, a nut having its threaded portion made in the form of automatically-opening spring-jaws. The washer may be a protuberance formed on the leg $a'$ instead of being in a separate piece.

I claim—

1. A retaining-nut for spring-calipers and like instruments, composed of two sections hinged together and threaded at one end, said sections being capable of rocking on their connecting-hinges to engage their threaded ends with or disengage them from the retaining-rod, as set forth.

2. The retaining-nut composed of the two sections connected by rings 5 5, inserted in sockets formed in the sections, as set forth.

In testimony whereof I have signed my name to this specification, in the presence of two subscribing witnesses, this 14th day of July, A. D. 1885.

CHARLES P. FAY.

Witnesses:
JOHN W. LABAM,
JULIUS W. LABAM.